US012798972B2

(12) United States Patent
Qin et al.

(10) Patent No.: US 12,798,972 B2
(45) Date of Patent: Nov. 17, 2026

(54) PREPARATION METHOD FOR HIGH-PURITY IRON PHOSPHATE AND USE THEREOF

(71) Applicants: YICHANG BRUNP YIHUA NEW MATERIAL CO., LTD, Yichang (CN); GUANGDONG BRUNP RECYCLING TECHNOLOGY CO., LTD., Foshan (CN); HUNAN BRUNP RECYCLING TECHNOLOGY CO., LTD., Changsha (CN)

(72) Inventors: Cunpeng Qin, Foshan (CN); Changdong Li, Foshan (CN); Dingshan Ruan, Foshan (CN); Shenghe Tang, Foshan (CN); Ruokui Chen, Foshan (CN); Zhenshuan Shi, Foshan (CN)

(73) Assignees: YICHANG BRUNP YIHUA NEW MATERIAL CO., LTD, Yichang (CN); GUANGDONG BRUNP RECYCLING TECHNOLOGY CO., LTD., Foshan (CN); HUNAN BRUNP RECYCLING TECHNOLOGY CO., LTD., Changsha (CN)

( * ) Notice: Subject to any disclaimer, the term of this patent is extended or adjusted under 35 U.S.C. 154(b) by 449 days.

(21) Appl. No.: 18/699,595

(22) PCT Filed: Dec. 1, 2022

(86) PCT No.: PCT/CN2022/135791
§ 371 (c)(1),
(2) Date: Apr. 9, 2024

(87) PCT Pub. No.: WO2023/142672
PCT Pub. Date: Aug. 3, 2023

(65) Prior Publication Data

US 2024/0400390 A1 Dec. 5, 2024

(30) Foreign Application Priority Data

Jan. 28, 2022 (CN) ......................... 202210105458.8

(51) Int. Cl.
*C01B 25/37* (2006.01)
*H01M 4/02* (2006.01)
*H01M 4/58* (2010.01)

(52) U.S. Cl.
CPC ......... *C01B 25/375* (2013.01); *H01M 4/5825* (2013.01); *C01P 2002/72* (2013.01);
(Continued)

(58) Field of Classification Search
CPC .... C01B 25/375; C01B 25/37; H01M 4/5825; H01M 2004/028; H01M 10/0525;
(Continued)

(56) References Cited

FOREIGN PATENT DOCUMENTS

| | | | |
|---|---|---|---|
| CN | 102424426 | A | 4/2012 |
| CN | 112551498 | A | 3/2021 |

OTHER PUBLICATIONS

Yi Ma et al., Preparation of Battery Grade Nano Iron Phosphate by Using Ferro-Phosphorus as Raw Material, Chemical Industry and Engineering Progress, Dec. 31, 2019, pp. 5015-5023, vol. 38, No. 11.

(Continued)

*Primary Examiner* — Anthony J Zimmer
*Assistant Examiner* — Logan Laclair
(74) *Attorney, Agent, or Firm* — Westbridge IP LLC

(57) ABSTRACT

Disclosed is a preparation method for high-purity iron phosphate and use thereof, including: mixing and stirring an iron phosphide waste, an acid liquor, an oxidant, and an adsorbent, heating for leaching, and subjecting a resulting mixture to solid-liquid separation (SLS) to obtain a first filtrate and a first filter residue; adding an alkali liquor to the (Continued)

first filtrate to adjust a pH, holding a temperature of a resulting mixture, and subjecting the mixture to SLS to obtain a second filter residue and a second filtrate; and subjecting the second filter residue to a heat treatment to obtain iron oxide; subjecting the iron oxide to high-energy ball-milling, and adding a surfactant for activation to obtain a slurry; and mixing the slurry with phosphoric acid, heating to allow a reaction, subjecting a resulting mixture to SLS to obtain a solid, and washing and sintering the solid to obtain the iron phosphate.

20 Claims, 4 Drawing Sheets

(52) U.S. Cl.
CPC ....... *C01P 2004/03* (2013.01); *C01P 2006/11* (2013.01); *C01P 2006/40* (2013.01); *C01P 2006/80* (2013.01); *H01M 2004/028* (2013.01)

(58) Field of Classification Search
CPC ... H01M 4/58; C01P 2002/72; C01P 2004/03; C01P 2006/11; C01P 2006/40; C01P 2006/80; C01P 2004/60; C01P 2006/12; C01P 2004/61; Y02E 60/10
See application file for complete search history.

(56) References Cited

OTHER PUBLICATIONS

International search report of PCT Patent Application No. PCT/CN2022/135791 issued on Feb. 22, 2023.

PREPARATION METHOD FOR HIGH-PURITY IRON PHOSPHATE AND USE THEREOF

TECHNICAL FIELD

The present disclosure belongs to the technical field of lithium-ion batteries (LIBs), and in particular relates to a preparation method for high-purity iron phosphate and use thereof.

BACKGROUND

A cathode material is the most important component of an LIB. Lithium iron phosphate (LFP, $LiFePO_4$) with an olivine structure has many advantages such as high theoretical capacity, high safety, environmental friendliness, and low cost. As a cathode material for LIBs, LFP is favored by researchers and the market in the field of energy storage. As a precursor of an LFP cathode material, $FePO_4$ can be used for large-scale production of highly-compacted $LiFePO_4$, and its quality and cost will directly impact the performance and cost of an LFP battery. At present, iron phosphate is mainly prepared by the technical method of co-precipitation, where a by-product ferrous sulfate of titanium dioxide production, a phosphorus source, an alkali liquor, an oxidant, and the like are used as raw materials; and the alkali liquor is used to adjust a pH, and iron phosphate is precipitated at a suitable pH. The conventional preparation method generally includes the two stages of reaction and aging, and the reaction stage requires relatively high temperature and energy consumption. However, in a preparation process, the adjustment of a pH of a system is easy to introduce impurities into a product (a purity of iron phosphate in the prior art is generally difficult to exceed 99%), and leads to a relatively high cost and a complicated process. Therefore, it is necessary to develop a new process to improve the physical and chemical indexes of a product, and the performance indexes of the product meet the preparation requirements of LFP batteries.

SUMMARY

The following is a summary of the subjects described in detail in the present disclosure. The present summary is not intended to limit the scope of protection of the claims.

The present disclosure provides a preparation method for high-purity iron phosphate and use thereof. The preparation method involves cheap raw materials, leads to less waste, and requires a low temperature, which can effectively reduce the energy consumption cost. In addition, iron phosphate prepared by the preparation method has a purity of 99.8% or more.

To achieve the above objective, the present disclosure adopts the following technical solutions:

A preparation method for iron phosphate is provided, including the following steps:

(1) mixing and stirring an iron phosphide waste, an acid liquor, an oxidant, and an adsorbent, heating for leaching, and subjecting a resulting mixture to solid-liquid separation (SLS) to obtain a first filtrate and a first filter residue;

(2) adding an alkali liquor to the first filtrate to adjust a pH, holding a temperature of a resulting mixture, and subjecting the mixture to SLS to obtain a second filter residue and a second filtrate; and subjecting the second filter residue to a heat treatment to obtain iron oxide;

(3) subjecting the iron oxide to high-energy ball-milling, and adding a surfactant for activation to obtain a slurry;

(4) adding an extracting agent and an acid liquor to the second filtrate obtained in step (2), conducting extraction and separation, and subjecting a resulting organic phase to stripping to obtain phosphoric acid; and (5) mixing the slurry obtained in step (3) with the phosphoric acid, heating to allow a reaction, subjecting a resulting mixture to SLS to obtain a solid, and washing and sintering the solid to obtain the iron phosphate.

Preferably, in step (1), the iron phosphide waste may include at least one selected from the group consisting of Fe, $Fe_3O_4$, FeP, and $Fe_2P$; and more preferably, the iron phosphide waste may include a mixture of FeP and $Fe_2P$.

Preferably, in step (1), the acid liquor may be at least two selected from the group consisting of nitric acid, sulfuric acid, and hydrochloric acid.

Further preferably, the acid liquor may be a mixture of nitric acid and sulfuric acid, and a molar ratio of the nitric acid to the sulfuric acid may be 1:(0.5-5).

More preferably, the molar ratio of the nitric acid to the sulfuric acid may be 1:(0.5-2).

Preferably, in step (1), the oxidant may be at least one selected from the group consisting of hydrogen peroxide, oxygen, nitric acid, and sodium persulfate.

Further preferably, the oxidant may be one selected from the group consisting of hydrogen peroxide and oxygen.

Preferably, in step (1), the adsorbent may be one selected from the group consisting of activated carbon, graphite, carbon molecular sieve, and zeolite molecular sieve.

Further preferably, the adsorbent may be activated carbon or graphite.

Preferably, in step (1), a speed of the stirring may be 300 rpm to 500 rpm, and more preferably, the speed of the stirring may be 350 rpm to 450 rpm.

Preferably, in step (1), the heating for leaching may be conducted at 80 °C to 100 °C for 2 h to 6 h; and further preferably, the heating for leaching may be conducted at 90 °C to 100 °C for 2 h to 3 h.

Preferably, in step (2), the alkali liquor may be at least one selected from the group consisting of a NaOH solution, a KOH solution, aqueous ammonia, a urea solution, $NH_4Cl$, $NH_4HCO_3$, $Na_2CO_3$, and $NaHCO_3$.

Further preferably, the alkali liquor may be one selected from the group consisting of a NaOH solution, aqueous ammonia, and a urea solution.

Preferably, in step (2), the pH may be adjusted to 2.5 to 5; and further preferably, the pH may be adjusted to 3.5 to 4.5.

Preferably, in step (2), the temperature may be held at 80 °C to 100 °C for 2 h to 4 h; and further preferably, the temperature may be held at 85 °C to 95 °C for 2 h to 3 h.

Preferably, in step (2), the heat treatment may be conducted at 400 °C to 650 °C for 2 h to 4 h.

Further preferably, the heat treatment may be conducted at 450 °C to 550 °C for 2 h to 4 h.

Preferably, in step (2), an oxidant for the heat treatment may be air.

Preferably, in step (3), the surfactant may be at least one selected from the group consisting of sodium dodecyl benzenesulfonate (SDBS), polyethylene glycol (PEG), sodium dodecyl sulfonate, and polyvinylpyrrolidone (PVP).

Further preferably, the surfactant may be at least one selected from the group consisting of SDBS and PEG.

Preferably, in step (3), the high-energy ball-milling may be conducted for 0.5 h to 3 h; and further preferably, the high-energy ball-milling may be conducted for 1 h to 1.5 h.

Preferably, in step (3), a device used for the high-energy ball-milling may be a high-energy ball-milling machine.

The high-energy ball-milling is conducted to pre-activate the slurry, enhance the activity of the iron source (iron oxide), reduce the reaction activation energy, and induce a low-temperature chemical reaction.

Preferably, in step (4), pure water with a temperature of 85 °C to 100 °C may be filled in an extraction tank used in the extraction; and further preferably, the pure water may have a temperature of 90 °C to 95 °C.

Preferably, in step (4), the extracting agent may be one selected from the group consisting of tributyl phosphate (TBP), isopropyl ether (IPE), isopropyl alcohol (IPA), isoamyl alcohol, n-butanol, and dibutyl sulfoxide (DBSO).

Further preferably, the extracting agent may be one selected from the group consisting of TBP, IPA, and n-butanol.

Preferably, in step (4), a mass ratio of the extracting agent to the phosphoric acid may be 1:(3-6); and further preferably, the mass ratio of the extracting agent to the phosphoric acid may be 1:(4.5-5.5).

Preferably, in step (4), the extraction may be conducted at 50 °C to 80 °C for 10 min to 120 min; and further preferably, the extraction may be conducted at 60 °C to 70 °C for 40 min to 70 min.

Preferably, in step (4), the acid liquor may be sulfuric acid, which is configured to increase an extraction yield; and an amount of the sulfuric acid added may be 1% to 3% of a mass of an extracted organic phase.

Preferably, step (4) may further include subjecting the phosphoric acid to concentration to obtain refined concentrated phosphoric acid.

Further preferably, the concentration may be conducted at 85 °C to 105 °C for 2 h to 10 h; and further preferably, the concentration may be conducted at 95 °C to 100 °C for 5 h to 8 h.

Preferably, in step (5), a molar ratio of Fe in the iron oxide to P in the phosphoric acid may be 1:(1-2); and further preferably, the molar ratio of Fe in the iron oxide to P in the phosphoric acid may be 1:(1.4-1.7).

Preferably, in step (5), the heating may be conducted at 50 °C to 80 °C, and a Fe content in a liquid phase obtained by the SLS may be less than or equal to 20 mg/L; and further preferably, the heating may be conducted at 60 °C to 70 °C, and the Fe content in the liquid phase may be less than or equal to 10 mg/L.

Preferably, in step (5), the washing may be conducted as follows: pulping the solid in a solid-to-liquid ratio of 1:(10-15) g/L, filtering, and rinsing a resulting filter cake with pure water in a solid-to-liquid ratio of 1:10 g/L until the electric conductivity is ≤500 μs/cm.

Preferably, in step (5), the sintering may be conducted as follows: in an atmosphere created by one or more selected from the group consisting of air and nitrogen, sintering at 200 °C to 350 °C for 1 h to 3 h, heating to 500 °C to 650 °C, and sintering for 2 h to 3 h.

Preferably, in step (5), the iron phosphate may have an impurity content of less than or equal to 0.10%; and further preferably, the iron phosphate may have an impurity content of less than or equal to 0.05%.

Preferably, in step (5), the iron phosphate may have D50 of 2 μm to 6 μm, a tap density of 0.80 $g/cm^3$ to 1.30 $g/cm^3$, and a specific surface area (SSA) of 4 $m^2/g$ to 8 $m^2/g$.

The present disclosure also provides use of the preparation method described above in the preparation of a battery material.

Compared with the prior art, the present disclosure has the following beneficial effects.

(1) In the present disclosure, an iron phosphide waste and the like are used as raw materials to prepare iron oxide (an iron source) and phosphoric acid; and then the iron source is activated through high-energy ball-milling and a surfactant, such as to enhance the activity of the iron source, reduce a reaction activation energy and a chemical reaction potential barrier, and induce a low-temperature chemical reaction to synthesize iron phosphate (without the addition of a precipitating agent and an alkali liquor). The obtained anhydrous iron phosphate has few impurities, uniform particle distribution, and a lamellar structure, and can be used as a precursor for highly-compacted LFP. Compared with the traditional synthesis of iron phosphate, the present disclosure adopts cheap raw materials and involves reactions facilitating a closed-loop production process. The preparation method produces less waste, and requires a relatively low temperature, which can effectively reduce the energy consumption cost. The process of the present disclosure involves simple devices, easy operations, and cheap raw materials, which can increase the economic benefits of enterprises.

(2) The present disclosure adopts a high-energy ball-milling machine and a surfactant to activate the iron source, such as to enhance the activity of the iron source and reduce the reaction activation energy and chemical reaction potential barrier, and thus the preparation of iron phosphate that usually requires a high-temperature reaction can also be achieved at a low temperature without the addition of a precipitating agent and an alkali liquor, which reduces the consumption of reagents.

(3) In the present disclosure, an alkali liquor is used only in the synthesis process of iron oxide, and no alkali liquor is used to adjust a pH in the synthesis process of iron phosphate, during which a pH of a reaction system is relatively low and does not increase significantly during the reaction process (not reaching a precipitation pH of impurity elements), which reduces the adsorption of impurity ions into the solid product during the reaction process, such that high-purity iron phosphate can be prepared.

(4) The phosphorus source used in the present disclosure is phosphoric acid obtained by subjecting a leaching liquor of an iron phosphide waste to extraction, stripping, and concentration, which can be used in the subsequent precipitation process to reduce the waste of resources.

(5) The traditional synthesis of iron phosphate generally requires a temperature of higher than 90 °C, while the preparation of iron phosphate in the present disclosure requires a temperature only of 50 °C to 80 °C (the high-energy ball-milling is conducted to pre-activate the slurry, enhance the activity of the iron source (iron oxide), reduce the reaction activation energy, and induce a low-temperature chemical reaction), which can effectively reduce the energy consumption cost. In the present disclosure, the energy utilization is high, and the energy consumption cost is lower than that of the conventional preparation process.

Other aspects can be understood after reading and understanding the drawings and detailed description.

BRIEF DESCRIPTION OF THE DRAWINGS

The drawings are intended to provide a further understanding of the technical solution herein and form part of the Specification, together with embodiments of the present disclosure, to explain the technical solution herein and do not constitute a limitation of the technical solution of the present disclosure.

DETAILED DESCRIPTION

Figure 1:
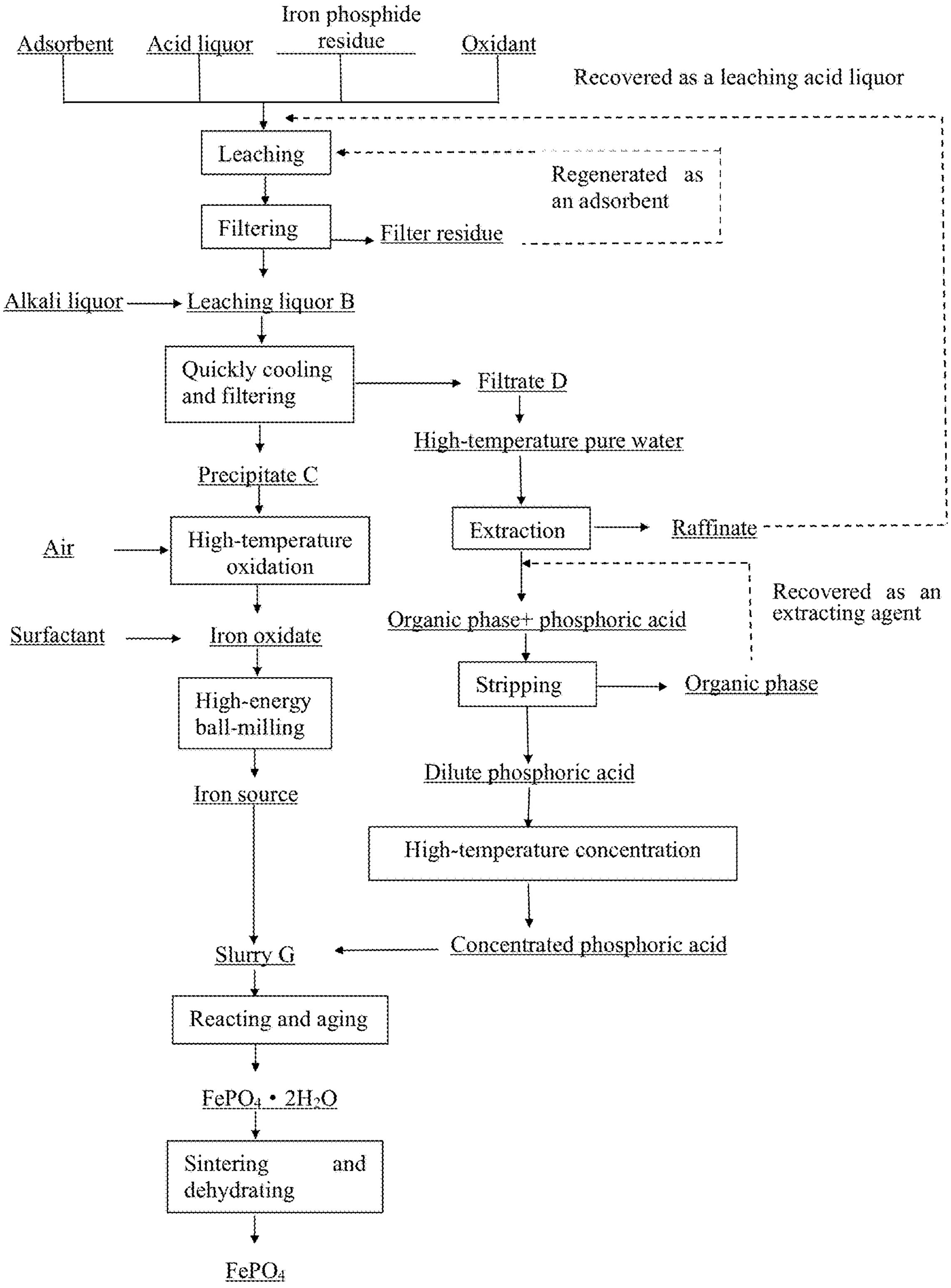
FIG. 1 is a schematic diagram illustrating a process flow of an example of the present disclosure.

The concepts and technical effects of the present disclosure are clearly and completely described below in conjunction with examples, so as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

A preparation method for high-purity iron phosphate was provided in this example, specifically including the following steps:

(1) 1 kg of an iron phosphide waste, 4 L of nitric acid with a concentration of 1.5 mol/L, 3 L of sulfuric acid with a concentration of 1.5 mol/L, and 100 g of activated carbon (an adsorbent) were added in a closed high-temperature and high-pressure reactor while introducing 1 mol of oxygen and thoroughly mixed to obtain a slurry A;

(2) the slurry A was heated to 95 °C, stirred at a speed of 350 rpm for combined leaching, and kept at the temperature for 2.5 h to obtain a first filtrate B and a first filter residue, where reaction equations were as follows: $4FeP+8O_2 \rightarrow 2Fe_2O_3+2P_2O_5$, $4Fe_2P+11O_2 \rightarrow 4Fe_2O_3+2P_2O_5$, and $4Fe+3O_2 \rightarrow 2Fe_2O_3$;

(3) 0.45 L of a NaOH solution with a concentration of 30% was added to the first filtrate B to adjust a pH to 3.5, a resulting mixture was kept at the temperature for 2 h and then filtered while being hot to obtain a precipitate C (a second filter residue) that was quickly cooled and a filtrate D (a second filtrate), and the second filter residue (the precipitate C) was subjected to a heat treatment at 500 °C to obtain 1.3 kg of iron oxide;

(4) 0.8 kg of the iron oxide obtained in step (3) was weighed and mixed with 10 L of pure water, then 17.25 g of SDBS was added as a surfactant, and a resulting mixture was stirred for 30 min and then subjected to high-energy ball-milling for 1.5 h in a high-energy ball-milling machine (Tencan Powder, XQM-12, 300 rpm, 100 ml of ethanol was used as a dispersing agent, 10 mm and 20 mm zirconium balls were mixed in a ratio of 3:1, and a mass ratio of milling balls to an iron oxide powder was 5:1) to pre-activate the iron oxide, and 10.5 kg of a slurry after the ball-milling was collected for later use;

(5) 6 L of filtrate D obtained in step (3) was added to a 10 L extraction tank with 2 L of pure water heated at 90 °C to obtain impurity-containing phosphoric acid, then 1 L of n-butanol (as an extracting agent) and 0.5 L of sulfuric acid with a concentration of 1.5 mol/L were added, and a resulting mixture was stirred at 95 °C for extraction and separation to obtain an organic phase and a raffinate; and the organic phase was subjected to stripping to obtain dilute phosphoric acid, the dilute phosphoric acid was subjected to high-temperature concentration at 100 °C, and when a concentration of resulting phosphoric acid was tested to be qualified, the high-temperature concentration was completed to obtain refined concentrated phosphoric acid F;

(6) 8 kg of the slurry obtained after the high-energy ball-milling was taken and added to a 10 L reactor, 0.824 kg of the concentrated phosphoric acid prepared in step (5) was added to maintain a total Fe/P ratio in a system at 1:1.15, and a resulting mixture was thoroughly stirred; a heating temperature was set to 70 °C and a stirring speed was set to 350 rpm to conduct a reaction for 6 h, and after the slurry turned completely white, SLS was conducted to obtain iron phosphate dihydrate and a mother liquor; and the mother liquor was collected, Fe and P contents in the mother liquor were tested to be 18.5 mg/L and 3.75 g/L respectively, and the mother liquor could be returned to the first filtrate or could be used for liquid-phase preparation of phosphoric acid; and (7) the iron phosphate dihydrate was slurried with 15 L of pure water to obtain a slurry, and the slurry was rinsed with 10 L of pure water until the electric conductivity was 395 µs/cm; and a filter cake obtained after the rinsing and filtering was dried at 100 °C for 20 h, and 1,100 g of a resulting powder was roasted and dehydrated to obtain anhydrous iron phosphate with an impurity content of less than or equal to 0.1%.

Figure 2:
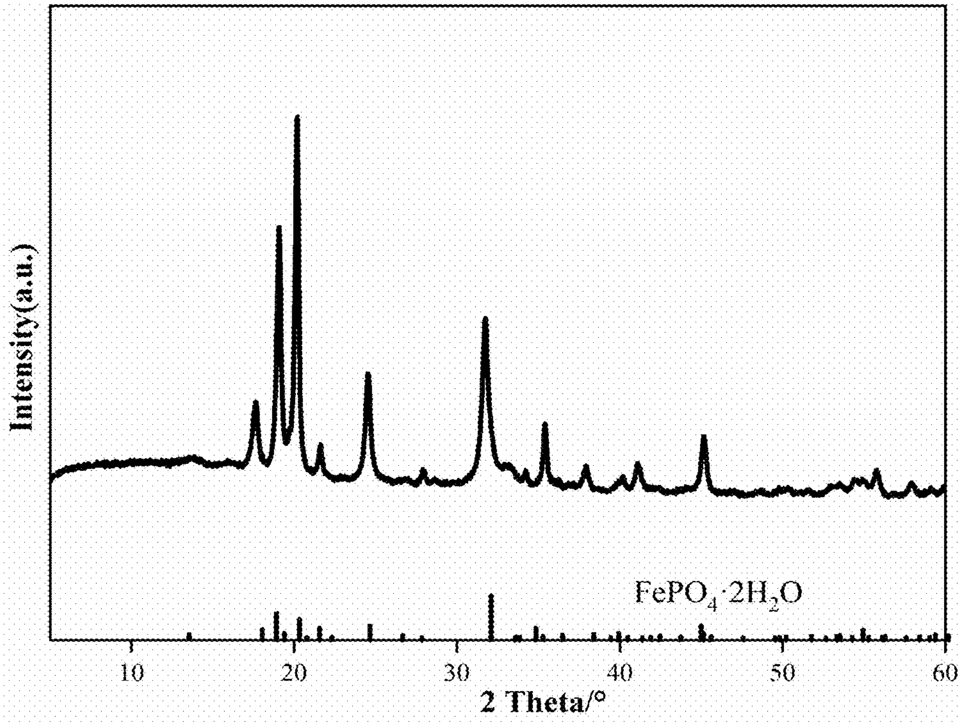
FIG. 2 is an X-ray diffraction (XRD) pattern of iron phosphate dihydrate prepared in Example 1 of the present disclosure.
Figure 3:
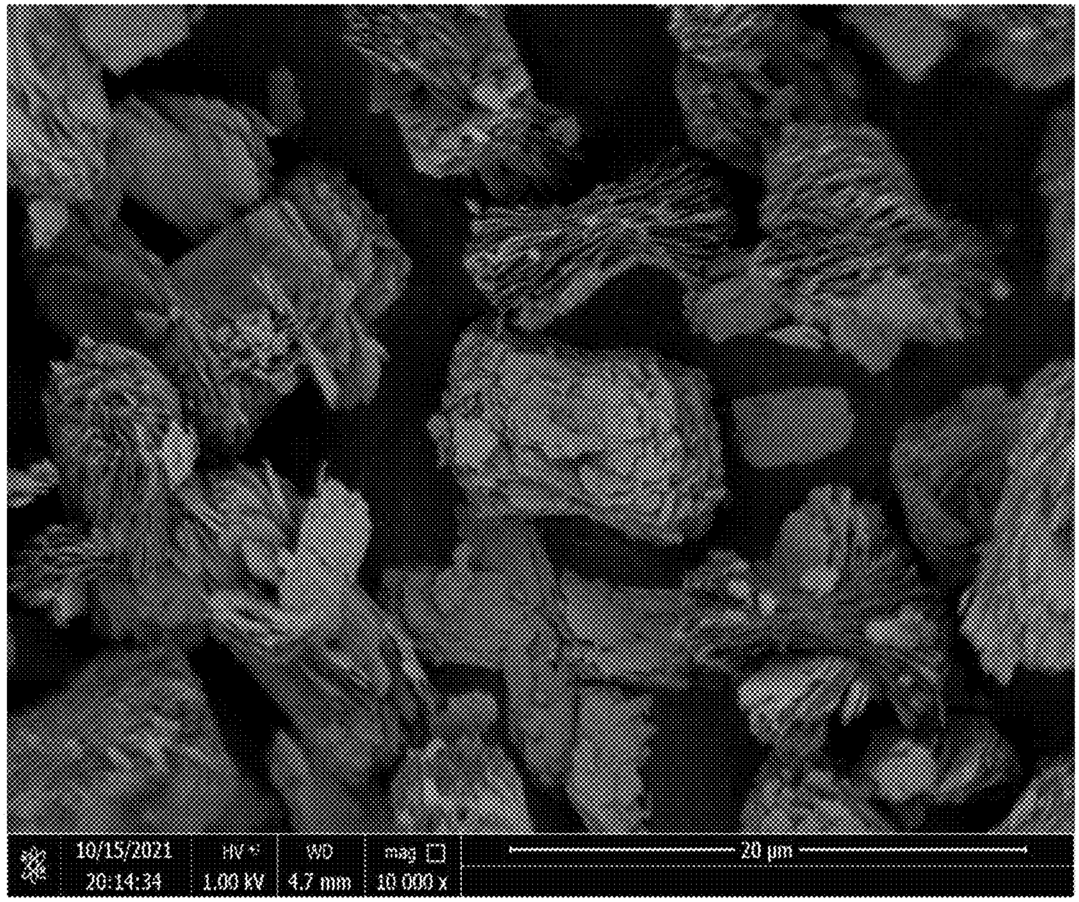
FIG. 3 is a scanning electron microscopy (SEM) image of iron phosphate dihydrate prepared in Example 1 of the present disclosure.
Figure 4:
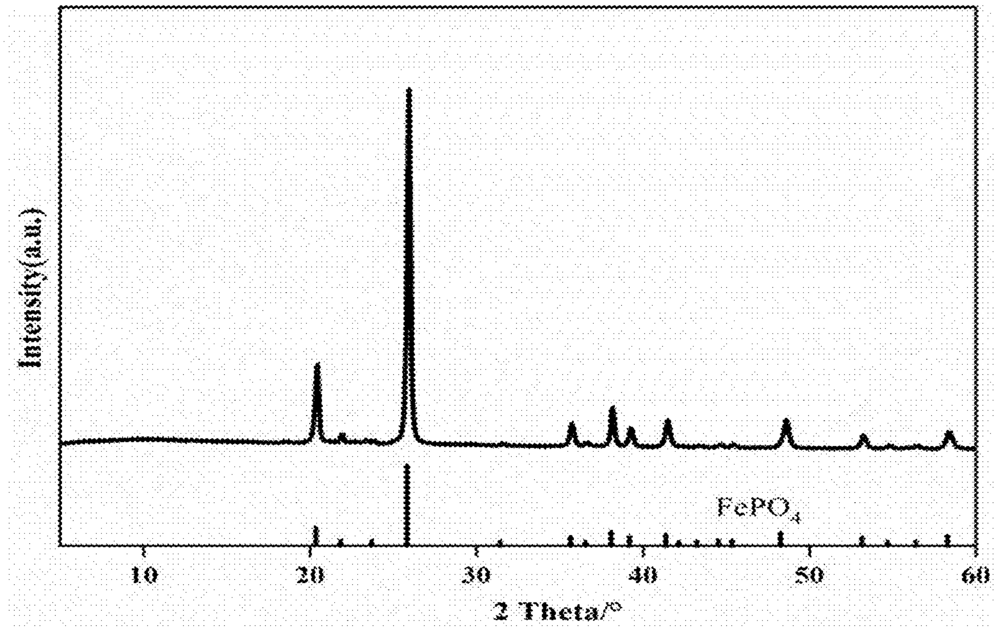
FIG. 4 is an XRD pattern of anhydrous iron phosphate prepared in Example 1 of the present disclosure.
Figure 5:
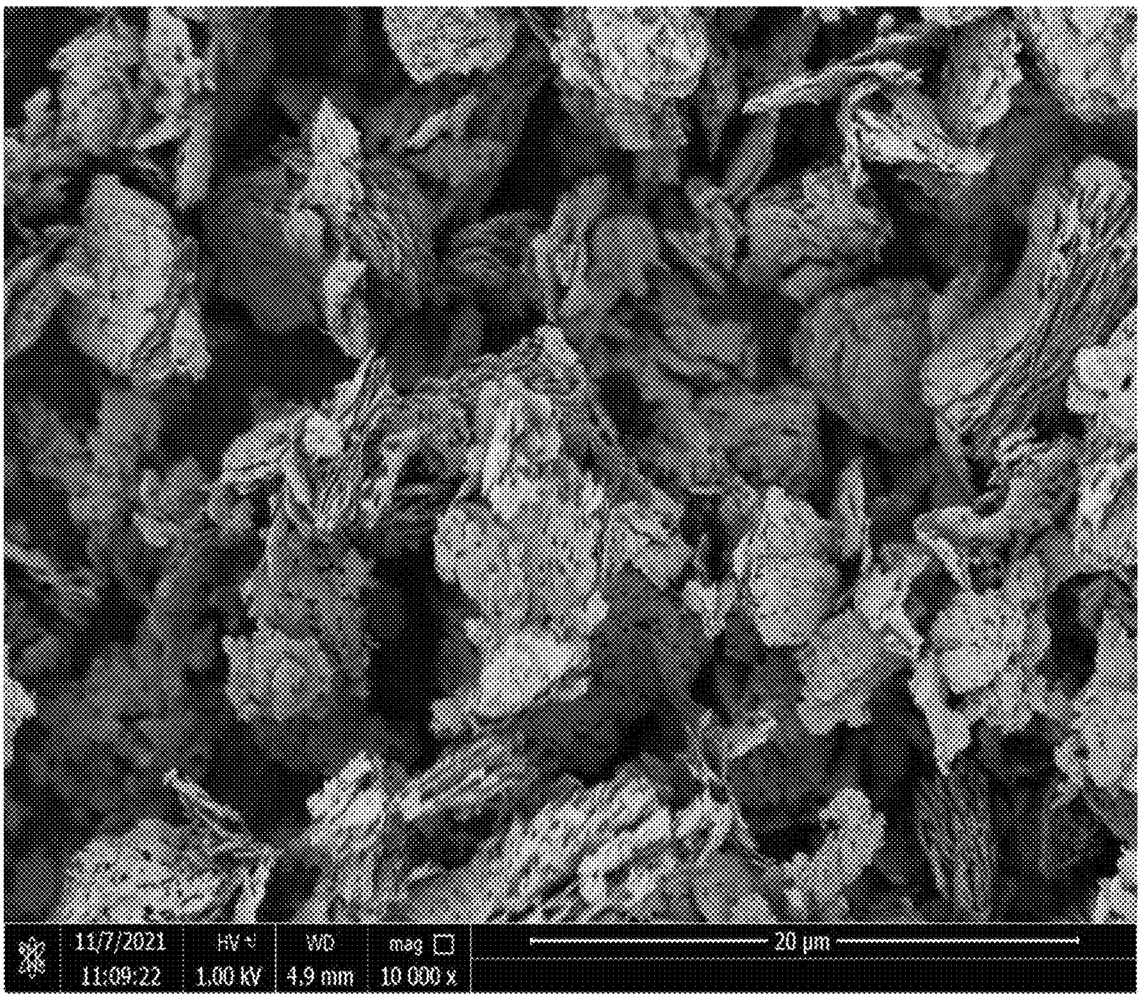
FIG. 5 is an SEM image of anhydrous iron phosphate prepared in Example 1 of the present disclosure.
Figure 6:
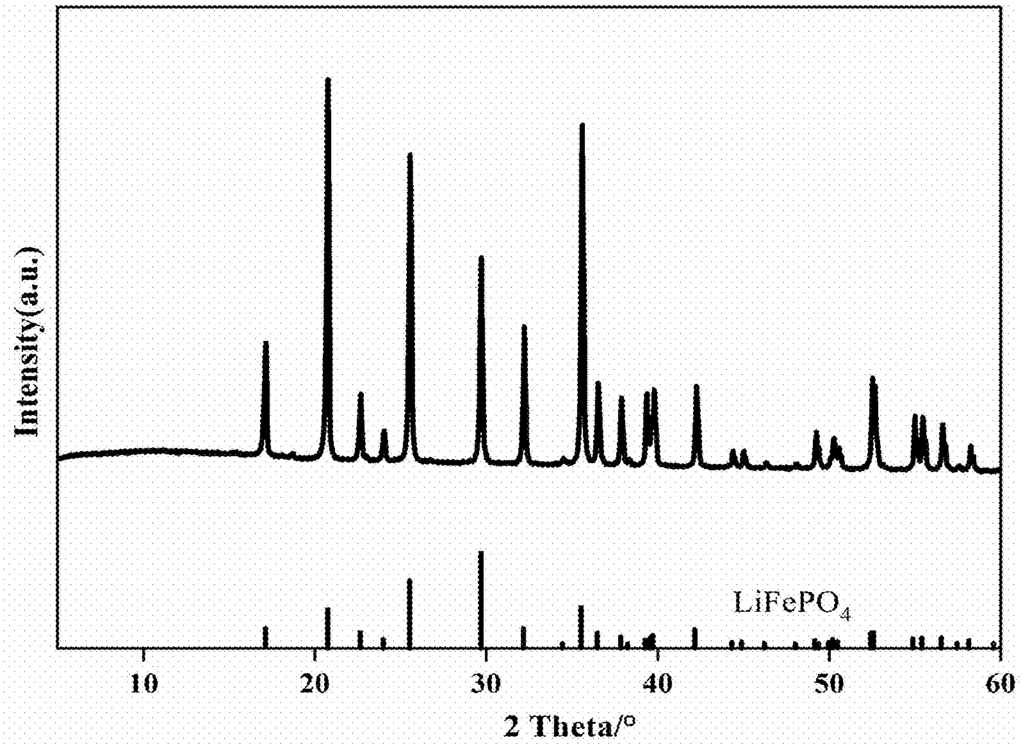
FIG. 6 is an XRD pattern of LFP synthesized from the anhydrous iron phosphate precursor prepared in Example 1 of the present disclosure.
Figure 7:
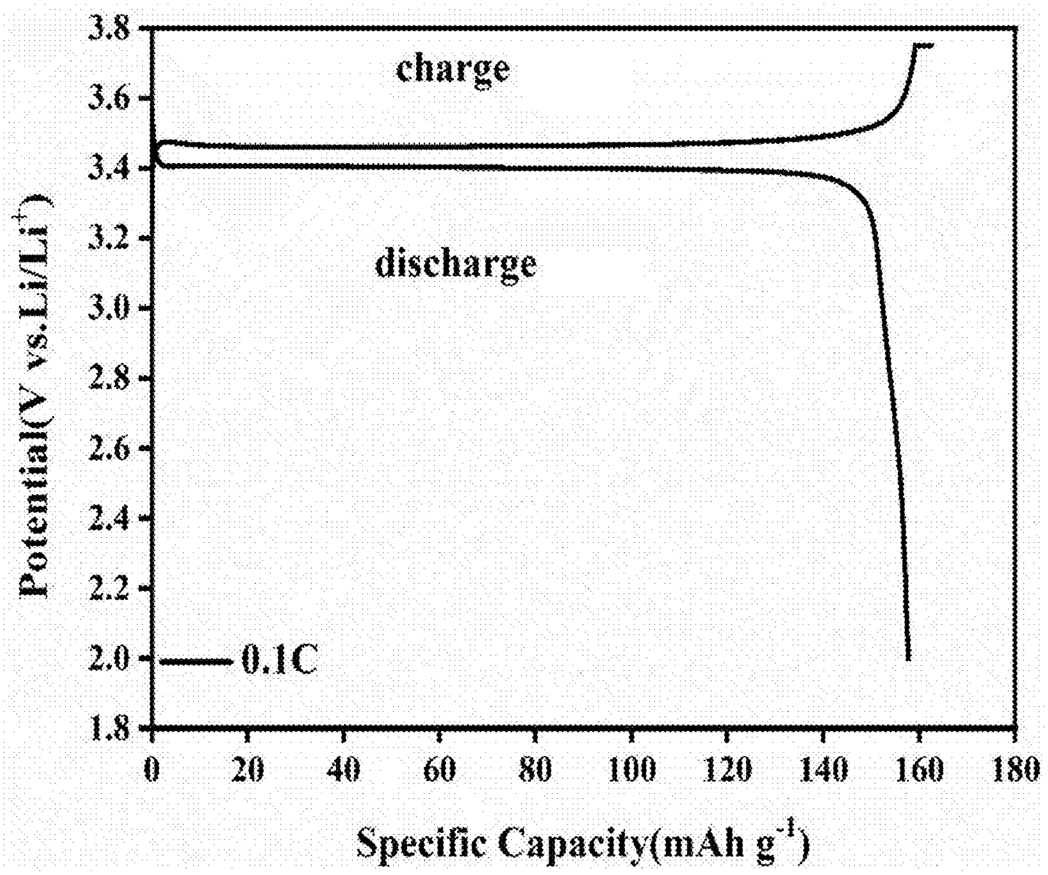
FIG. 7 shows charge-discharge curves of the LFP synthesized from the anhydrous iron phosphate precursor prepared in Example 1 of the present disclosure at 0.1 C.

FIG. 1 is a schematic diagram illustrating a process flow of an example of the present disclosure; FIG. 2 and FIG. 3 are respectively an XRD pattern and an SEM image of the iron phosphate dihydrate prepared in Example 1; and FIG. 4 and FIG. 5 are respectively an XRD pattern and an SEM image of the anhydrous iron phosphate prepared in Example 1. According to FIG. 2 and FIG. 4 with the 2 Theta (diffraction angle) as x-coordinate and the intensity as y-coordinate, the crystallinity and purity of a product can be preliminarily determined, and it can be seen that the iron phosphate prepared in Example 1 shows high phase purity and prominent crystallinity before and after the dehydration and has no impurity phase. It can be seen from FIG. 3 that primary particles in the prepared iron phosphate dihydrate present a lamellar structure, and have a narrow particle size distribution and prominent dispersibility. It can be seen from FIG. 5 that, after the prepared iron phosphate is subjected to high-temperature sintering, the primary particles still present a flaky overall morphology, and the surface of the primary particles is obviously melting and has porous structure, which meets the requirements to form a highly-compacted LFP battery precursor. FIG. 6 is an XRD pattern of the LFP synthesized with Example 1 as a precursor, and it can be seen that the LFP prepared by the present disclosure has no impurity phase, while has prominent crystallinity, complete crystal structure, and an olivine structure. FIG. 7 shows charge-discharge curves of the LFP synthesized with Example 1 as a precursor at a constant current of 0.1 C, with the specific capacity as x-coordinate and the voltage as y-coordinate, and it can be seen from the curves that the initial charge and discharge capacities are 159.5 mAh/g and 157.6 mAh/g respectively, electrical performance results are similar to that of a commercial product, and the compaction density can reach 2.42 g/cm$^3$, indicating that the iron phosphate prepared by the present disclosure is suitable as a precursor material for highly-compacted LFP.

Example 2

A preparation method for high-purity iron phosphate was provided in this example, specifically including the following steps:

(1) 1 kg of an iron phosphide waste, 4.5 L of nitric acid with a concentration of 1.5 mol/L, 2 L of sulfuric acid with a concentration of 1.5 mol/L, and 150 g of activated carbon were added in a closed high-temperature and high-pressure reactor while introducing 1 mol of oxygen and thoroughly mixed to obtain a slurry A;

(2) the slurry A was heated to 93 °C, stirred at a speed of 380 rpm for combined leaching, and kept at the temperature for 3 h to obtain a first filtrate B and a first filter residue;

(3) 0.45 L of a NaOH solution with a concentration of 30% was added to the first filtrate B to adjust a pH to 4, a resulting mixture was kept at the temperature for 2.5 h and then filtered while being hot to obtain a precipitate C (a second filter residue) that was quickly cooled and a filtrate D (a second filtrate), and the precipitate C was subjected to a heat treatment at 550 °C to obtain 1.35 kg of iron oxide;

(4) 0.8 kg of the iron oxide obtained in step (3) was weighed and mixed with 10 L of pure water, then 25.87 g of SDBS was added, and a resulting mixture was stirred for 60 min and then subjected to high-energy ball-milling for 2 h in a high-energy ball-milling machine to pre-activate the iron oxide, and 10 kg of a slurry after the ball-milling was collected for later use;

(5) the 6 L of filtrate D obtained in step (3) was added to a 10 L extraction tank with 2 L of pure water heated at 90 °C to obtain impurity-containing phosphoric acid, then 1.5 L of isobutanol (as an extracting agent) and 0.5 L of sulfuric acid with a concentration of 1.5 mol/L were added, and a resulting mixture was stirred at 98 °C for extraction and separation to obtain an organic phase and a raffinate; and the organic phase was subjected to stripping to obtain dilute phosphoric acid, the dilute phosphoric acid was subjected to high-temperature concentration at 98 °C, and when a concentration of resulting phosphoric acid was tested to be qualified, the high-temperature concentration was completed to obtain refined concentrated phosphoric acid F;

(6) 8.0 kg of the slurry obtained after the high-energy ball-milling was taken and added to a 10 L reactor, 0.739 kg of the concentrated phosphoric acid prepared in step (5) was added to maintain a total Fe/P ratio in a system at 1:1.1, and a resulting mixture was thoroughly stirred; a heating temperature was set to 60 °C and a stirring speed was set to 350 rpm to conduct a reaction for 8 h, and after the slurry turned completely white, SLS was conducted to obtain iron phosphate dihydrate and a mother liquor (a second filtrate); and the mother liquor was collected, Fe and P contents in the mother liquor were tested to be 19.3 mg/L and 2.35 g/L respectively, and the mother liquor (a second filtrate) could be returned to the first filtrate or could be used for liquid-phase preparation of phosphoric acid; and (7) the iron phosphate dihydrate was slurried with 12 L of pure water to obtain a slurry, and the slurry was rinsed with 10 L of pure water until the electric conductivity was 303 μs/cm; and a filter cake obtained after the rinsing and filtering was dried at 100 °C for 20 h, and 900 g of a resulting powder was roasted and dehydrated to obtain anhydrous iron phosphate with an impurity content of less than or equal to 0.1%.

Example 3

A preparation method for high-purity iron phosphate was provided in this example, specifically including the following steps:

(1) 1 kg of an iron phosphide waste, 2.5 L of nitric acid with a concentration of 1.5 mol/L, 4.5 L of sulfuric acid with a concentration of 1.5 mol/L, and 150 g of activated carbon were added in a closed high-temperature and high-pressure reactor while introducing 2.5 mol of oxygen and thoroughly mixed to obtain a slurry A;

(2) the slurry A was heated to 95 °C, stirred at a speed of 400 rpm for combined leaching, and kept at the temperature for 3 h to obtain a first filtrate B and a first filter residue;

(3) 0.6 L of a NaOH solution with a concentration of 30% was added to the first filtrate B to adjust a pH to 4.5, a resulting mixture was kept at the temperature for 3 h and then filtered while being hot to obtain a precipitate C (a second filter residue) that was quickly cooled and a filtrate D (a second filtrate), and the precipitate C was subjected to a heat treatment at 450 °C to obtain 1.4 kg of iron oxide;

(4) 0.7 kg of the iron oxide obtained in step (3) was weighed and mixed with 12 L of pure water, then 31.05 g of SDBS was added as a surfactant, and a resulting mixture was stirred for 45 min and then subjected to high-energy ball-milling for 1.5 h in a high-energy ball-milling machine to pre-activate the iron source, and 10 kg of a slurry after the ball-milling was collected for later use;

(5) the 5.5 L of filtrate D obtained in step (3) was added to a 10 L extraction tank with 1.5 L of pure water heated at 95 °C to obtain impurity-containing phosphoric acid, then 2 L of isoamyl alcohol (as an extracting agent) and 0.7 L of sulfuric acid with a concentration of 1.5 mol/L were added, and a resulting mixture was stirred at 95 °C for extraction and separation to obtain an organic phase and a raffinate; and the organic phase was subjected to stripping with hot pure water to obtain dilute phosphoric acid, the dilute phosphoric acid was subjected to high-temperature concentration at 100 °C, and when a concentration of resulting phosphoric acid was tested to be qualified, the high-temperature concentration was completed to obtain refined concentrated phosphoric acid F;

(6) 8.0 kg of the slurry obtained after the high-energy ball-milling was taken and added to a 10 L reactor, 0.739 kg of the concentrated phosphoric acid prepared in step (5) was added to maintain a total Fe/P ratio in a system at 1:1.18, and a resulting mixture was thoroughly stirred; a heating temperature was set to 55 °C and a stirring speed was set to 330 rpm to conduct a reaction for 7 h, and after the slurry turned completely white, SLS was conducted; and a resulting mother liquor was collected, Fe and P contents in the mother liquor were tested to be 10.2 mg/L and 2.13 g/L respectively, and the mother liquor could be returned to the first filtrate or could be used for liquid-phase preparation of phosphoric acid; and (7) the iron phosphate dihydrate was slurried with 15 L of pure water to obtain a slurry, and the slurry was rinsed with 10 L of pure water until the electric conductivity was 215 μs/cm; and a filter cake obtained after the rinsing and filtering was dried at 100 °C for 18 h, and 890 g of a resulting powder was roasted and dehydrated to obtain anhydrous iron phosphate with an impurity content of less than or equal to 0.1%.

Comparative Example 1

A preparation method for iron phosphate was provided in this comparative example, specifically including the following steps:

(1) the by-product ferrous sulfate of titanium dioxide production was dissolved in pure water to prepare a ferrous sulfate solution A with a Fe concentration of 45 g/L;

(2) an ammonium dihydrogen phosphate (ADP) solution, phosphoric acid, and hydrogen peroxide were mixed to prepare a phosphorus source/oxidant mixed solution B;

(3) with the solution A as a medium solution in a reactor, the mixed solution B was pumped into the reactor at a specified speed under a specified temperature and stirring state, such that a Fe/P ratio in a reaction system was about 1:1.1, and a pH in a reaction process was maintained at 1.5 to 2; and (4) the reaction system was heated and stirred at 88 °C to obtain an iron phosphate precipitate, and the precipitate was aged for 3 h after turning white, then filtered out, washed until the electric conductivity was 400 μs/cm or less, dried, and dehydrated to obtain an anhydrous iron phosphate powder.

Analysis of Examples 1 to 3 and Comparative Example 1

Table 1 shows impurity element contents in the iron phosphate products prepared in Examples 1, 2, and 3, the prepared iron oxide, and the commercially-available Yacheng iron phosphate, the iron phosphate products prepared in Comparative Example 1. Specific data were obtained by an inductively coupled plasma-atomic emission spectroscopy (ICP-AES) instrument. It can be seen from Table 1 that there are many impurities in the prepared iron oxide raw material; and since the preparation method of the present disclosure does not change the pH of the system and the impurity elements are not precipitated with the iron phosphate, the impurity content in each of the iron phosphate products prepared in the examples is significantly lower than that in the commercially-available standard, indicating that this preparation method can greatly purify iron phosphate and improve the physical and chemical indexes of the product.

TABLE 1

| Impurity element (%) | Example 1 | Example 2 | Example 3 | Iron oxide | Commercially-available Yacheng iron phosphate | Index for commercially-available iron phosphate | Comparative Example 1 |
|---|---|---|---|---|---|---|---|
| Ni | 0.0001 | 0.0009 | 0.0011 | 0.0082 | 0.0005 | ≤0.0100 | 0.0009 |
| C | 0.0015 | 0.0012 | 0.0014 | 0.0823 | 0.0008 | ≤0.0100 | 0.0015 |
| Ca | 0.0001 | 0.0005 | 0.0011 | 0.1012 | 0.0004 | ≤0.0100 | 0.0001 |
| Cr | 0.0001 | 0.0005 | 0.0003 | 0.0093 | 0.0011 | ≤0.0100 | 0.0001 |
| S | 0.0030 | 0.0009 | 0.0015 | 0.2786 | 0.0156 | ≤0.0300 | 0.0286 |
| Si | 0.0001 | 0.0005 | 0.0009 | 0.0211 | 0.0005 | ≤0.0100 | 0.0001 |
| Ti | 0.0025 | 0.0012 | 0.0014 | 0.0012 | 0.0009 | ≤0.0100 | 0.0052 |
| Zn | 0.0001 | 0.0001 | 0.0002 | 0.0027 | 0.0019 | ≤0.0100 | 0.0002 |
| Al | 0.0003 | 0.0001 | 0.0001 | 0.0038 | 0.0058 | ≤0.0050 | 0.0010 |
| Co | 0.0003 | 0.0005 | 0.0009 | 0.0012 | 0.0005 | ≤0.0100 | 0.0009 |
| Mn | 0.0005 | 0.0003 | 0.0002 | 0.0138 | 0.0174 | ≤0.0100 | 0.0001 |
| Mg | 0.0001 | 0.0002 | 0.0001 | 0.0093 | 0.0132 | ≤0.0100 | 0.0001 |
| Insoluble matter | 0.0001 | 0.0004 | 0.0005 | 0.0085 | 0.0021 | ≤0.0100 | 0.0009 |

Test Example

The anhydrous iron phosphate prepared in Examples 1 to 3 and the commercially-available Yacheng iron phosphate were each prepared into LFP by a conventional method under the same conditions, and the compaction density and other electrical performances were determined for the prepared LFP. Results were shown in Table 2 below.

TABLE 2

| | Compaction density ($g/cm^3$) | Initial charge capacity at 0.1 C (mAh/g) | Initial discharge capacity at 0.1 C (mAh/g) | Initial discharge efficiency at 0.1 C (%) | Capacity retention after 500 cycles at 25° C. and 1 C (%) |
|---|---|---|---|---|---|
| Example 1 | 2.42 | 159.5 | 157.6 | 98.81 | 96.52 |
| Example 2 | 2.41 | 160.1 | 157.3 | 98.25 | 96.56 |
| Example 3 | 2.39 | 161.2 | 158.0 | 98.01 | 96.11 |
| Commercially-available iron phosphate | 2.36 | 159.5 | 157.2 | 98.55 | 95.99 |
| Comparative Example 1 | 2.38 | 159.8 | 157.2 | 98.37 | 96.03 |

The LFP powders prepared from the anhydrous iron phosphate prepared in Examples 1 to 3 of the present disclosure exhibited a compaction density and electrical performances close to those of LFP prepared from the commercially-available iron phosphate, indicating that the iron phosphate prepared in the present disclosure meets the standards of battery-grade anhydrous iron phosphate for LFP, and has performance even exceeding that of the commercially-available iron phosphate.

The examples of present disclosure are described in detail with reference to the accompanying drawings, but the present disclosure is not limited to the above examples. Within the scope of knowledge possessed by those of ordinary skill in the technical field, various changes can also be made without departing from the purpose of the present disclosure. In addition, the examples and features in the examples in the present disclosure may be combined with each other in a non-conflicting situation.

The invention claimed is:

1. A preparation method for high-purity iron phosphate, comprising the following steps:

(1) mixing and stirring an iron phosphide waste, an acid liquor, an oxidant, and an adsorbent, heating for leaching, and subjecting a resulting mixture to solid-liquid separation (SLS) to obtain a first filtrate and a first filter residue;

(2) adding an alkali liquor to the first filtrate to adjust a pH, holding a temperature of a resulting mixture, and subjecting the mixture to SLS to obtain a second filter residue and a second filtrate; and subjecting the second filter residue to a heat treatment to obtain iron oxide;

(3) subjecting the iron oxide to high-energy ball-milling, and adding a surfactant for activation to obtain a slurry;

(4) adding an extracting agent and an acid liquor to the second filtrate obtained in step (2), conducting extraction and separation, and subjecting a resulting organic phase to stripping to obtain phosphoric acid; and (5) mixing the slurry obtained in step (3) with the phosphoric acid, heating to allow a reaction, subjecting a resulting mixture to SLS to obtain a solid, and washing and sintering the solid to obtain the high-purity iron phosphate.

2. The preparation method according to claim 1, wherein in step (1), the iron phosphide waste comprises at least one selected from the group consisting of Fe, $Fe_3O_4$, FeP, and $Fe_2P$.

3. The preparation method according to claim 1, wherein in step (1), the acid liquor is at least two selected from the group consisting of nitric acid, sulfuric acid, and hydrochloric acid.

4. The preparation method according to claim 1, wherein in step (1), the oxidant is at least one selected from the group consisting of hydrogen peroxide, oxygen, nitric acid, and sodium persulfate.

5. The preparation method according to claim 1, wherein in step (1), the adsorbent is one selected from the group consisting of activated carbon, graphite, carbon molecular sieve, and zeolite molecular sieve.

6. The preparation method according to claim 1, wherein in step (2), the alkali liquor is at least one selected from the group consisting of a NaOH solution, a KOH solution, aqueous ammonia, a urea solution, $NH_4Cl$, $NH_4HCO_3$, $Na_2CO_3$, and $NaHCO_3$.

7. The preparation method according to claim 1, wherein in step (3), the surfactant is at least one selected from the group consisting of sodium dodecyl benzenesulfonate, polyethylene glycol, sodium dodecyl sulfonate, and polyvinylpyrrolidone.

8. The preparation method according to claim 1, wherein in step (4), the extracting agent is one selected from the group consisting of tributyl phosphate, isopropyl ether, isopropyl alcohol, n-butanol, and dibutyl sulfoxide.

9. The preparation method according to claim 1, wherein in step (5), a molar ratio of Fe in the slurry to P in the phosphoric acid is 1:(1-2); the heating to allow a reaction is conducted at 50 °C to 80 °C for 20 min to 60 min; and the iron phosphate has a $D_{50}$ of 2 μm to 6 μm, a tap density of 0.80 $g/cm^3$ to 1.30 $g/cm^3$, and a specific surface area (SSA) of 4 $m^2/g$ to 8 $m^2/g$.

10. The preparation method according to claim 1, wherein in step (5), the washing is conducted as follows: pulping the solid in a solid-to-liquid ratio of 1:(10-15) g/L, filtering, and rinsing a resulting filter cake with pure water in a solid-to-liquid ratio of 1:10 g/L until an electric conductivity of water is ≤500 μs/cm.

11. A process of preparing a cathode material comprising: the preparation method according to claim 1; and a step of preparing a cathode material.

12. A process of preparing a cathode material comprising: the preparation method according to claim 2; and a step of preparing a cathode material.

13. A process of preparing a cathode material comprising: the preparation method according to claim 3; and a step of preparing a cathode material.

14. A process of preparing a cathode material comprising: the preparation method according to claim 4; and a step of preparing a cathode material.

15. A process of preparing a cathode material comprising: the preparation method according to claim 5; and a step of preparing a cathode material.

16. A process of preparing a cathode material comprising: the preparation method according to claim 6; and a step of preparing a cathode material.

17. A process of preparing a cathode material comprising: the preparation method according to claim 7; and a step of preparing a cathode material.

18. A process of preparing a cathode material comprising: the preparation method according to claim 8; and a step of preparing a cathode material.

19. A process of preparing a cathode material comprising: the preparation method according to claim 9; and a step of preparing a cathode material.

20. A process of preparing a cathode material comprising: the preparation method according to claim 10: and a step of preparing a cathode material.

* * * * *